Sept. 21, 1965 P. G. KLEMKE 3,207,508
REVOLVING AND TRANSLATING AERIAL TRAPEZE
Filed July 12, 1963 2 Sheets-Sheet 1
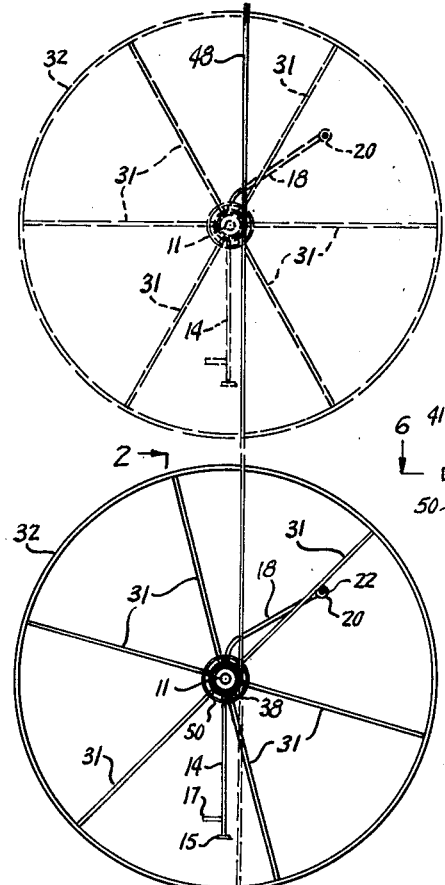
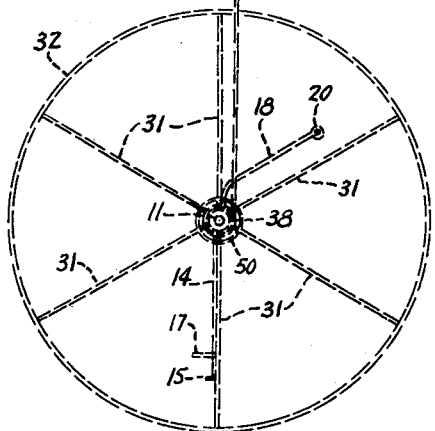
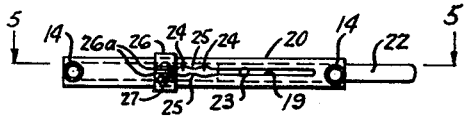
INVENTOR.
PAUL G. KLEMKE
BY Kimmel & Crowell
ATTORNEYS.

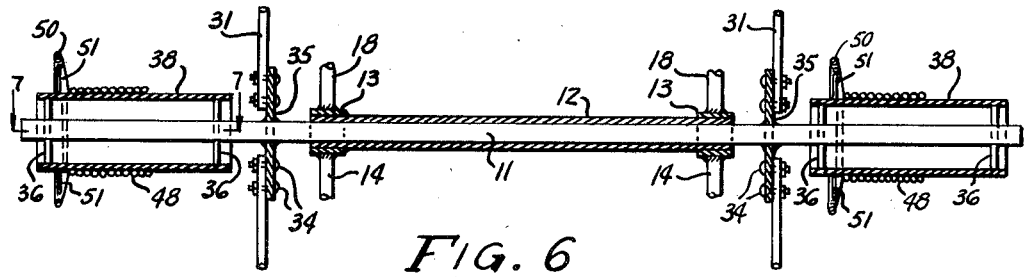
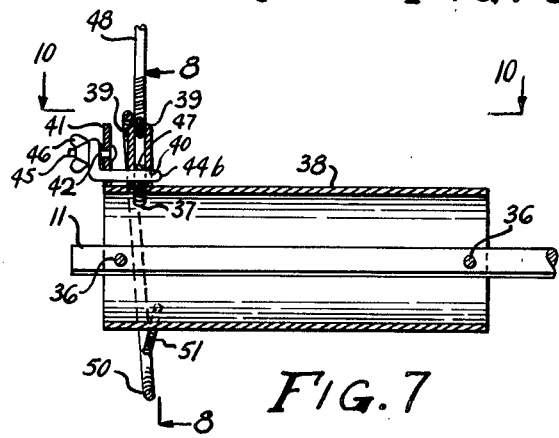
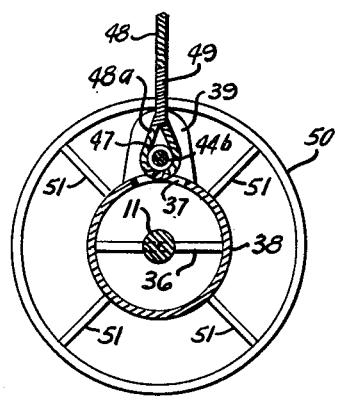
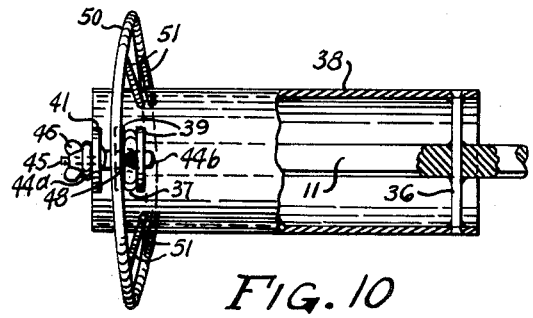
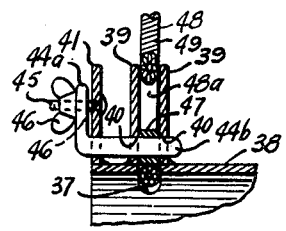
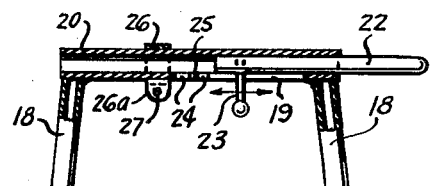

United States Patent Office 3,207,508
Patented Sept. 21, 1965

3,207,508
REVOLVING AND TRANSLATING AERIAL
TRAPEZE
Paul G. Klemke, P.O. Box 1475, Sarasota, Fla.
Filed July 12, 1963, Ser. No. 294,626
9 Claims. (Cl. 272—7)

This invention relates to an aerial trapeze having a cage or wheel for carrying a gymnast or performer, which wheel both rotates and moves with its axis in linear motion.

The present invention has utility in several respects. It is well adapted for circus work, where a performer goes through a regular routine before an audience. It can also be used in a gymnasium, where persons who frequent such places go through routine exercises. Another use would be by a person athletically inclined for occasional diversion.

An object of the present invention is to provide an aerial trapeze including a rotatable cage or wheel adapted to carry a performer and suspended by cables in such manner that the cage will rotate about its axis in one direction of angular movement, and also move linearly along the cables in one direction until the latter have been fully extended, and then reverse both motions and rotate about its axis in the opposite angular direction, and also move linearly along the cables in the opposite direction.

Another object of the present invention is to provide an aerial trapeze including a rotatable cage or wheel supported by cables in which the performer may store up potential energy for the described motions by walking inside the cage and winding up the cage with the ropes about its axles.

An additional object of the present invention is to provide an aerial trapeze including a rotatable cage or wheel supported by cables and a swing pivotally mounted within the cage, in which the performer may wind up the cage in the described manner and then hold same in the desired position.

A further object of the present invention is to provide an aerial trapeze including a rotatable cage or wheel supported by cables and a swing pivotally mounted within the cage in which the performer may stand in vertical position on the swing and partake of only the translatory movement of the trapeze, while the cage revolves about him in descending.

Still another object of the present invention is to provide an aerial trapeze including a rotatable cage or wheel supported by cables, a swing pivotally mounted within the cage, and releasable engagement means between the swing and the cage, so that the performer may sit or stand and revolve with the swing, independently of the rotation of the cage.

A still further object of the present invention is to provide an aerial trapeze including the above described combination of a rotatable cage surrounding a swing in which the performer may sit or stand on the swing and revolve with the latter, while the cage revolves about him at a greater rate.

Additional objects, advantages, and improvements will become apparent from the following specification, taken in connection with the accompanying drawing, in which:

FIGURE 1 is a side elevational view showing the cage or wheel and swing of the aerial trapeze according to the present invention in upper, intermediate and lower positions;

FIGURE 2 is substantially a vertical sectional view, taken on the section line 2—2 of FIGURE 1 and looking in the direction of the arrows, showing the construction of the cage or wheel and swing;

FIGURE 3 is a detail horizontal sectional view, taken on the section line 3—3 of FIGURE 2 and looking in the direction of the arrows, and showing the stirrups at the bottom of the swing;

FIGURE 4 is a detail horizontal sectional view, taken on the section line 4—4 of FIGURE 2 and looking in the direction of the arrows, showing the bolt for latching the swing to the cage or wheel;

FIGURE 5 is a detail horizontal sectional view, taken on the section line 5—5 of FIGURE 4 and looking in the direction of the arrows;

FIGURE 6 is a horizontal sectional view, taken on the section line 6—6 of FIGURE 2 and looking in the direction of the arrows;

FIGURE 7 is a detail horizontal sectional view, taken on the section line 7—7 of FIGURE 6 and looking in the direction of the arrows, showing one of the cable winding drums;

FIGURE 8 is a vertical sectional view, taken on the section line 8—8 of FIGURE 7 and looking in the direction of the arrows, showing the attachment of one of the supporting cables to one of the winding drums;

FIGURE 9 is a longitudinal detail vertical sectional view, showing the detachable feature of one of the supporting cables to one of the winding drums; and FIGURE 10 is a top plan view, partly in section, taken on the line 10—10 of FIGURE 7 and looking in the direction of the arrows, showing the guide for the supporting cable on one of the winding drums.

Referring now to the drawings in detail, and to FIGURES 1, 3, and 6 in particular, a central axle or shaft 11 is the axis of the entire device. A swing is generally designated by the reference numeral 10. This swing is rotatably supported on the axle 11 by a bearing sleeve 12, which freely surrounds the axle. At its ends the sleeve 12 is surrounded by hubs 13—13 which are secured to the sleeve in any suitable manner. Rods 14—14 are secured at their upper ends to the hubs 13—13 and these rods form the supporting structure for the body of the performer from the feet to the waist. The rods 14—14 are generally parallel for the major portion of their length but toward their lower ends they are curved inwardly in converging relationship. At their bottoms the rods are united by a cross rod 15, which serves as a support for the feet of the performer. In each corner, between the adjacent rod 14 and the cross rod 15, there is mounted a stirrup 16, these stirrups being generally of right angle shape but rounded at their vertices. A U-shaped heel support bar 17 is mounted on the rear sides of the rods 14—14 and above the cross rod 15, this support bar being secured at its opposite ends to the rods. The support bar keeps the feet of the performer from sliding out of the stirrups 16—16.

The forward part of the swing is comprised by another pair of rods 18—18, which are similar to the handle bars on a bicycle. These latter rods are positioned at an obtuse angle relative to the respective rods 14—14 and are also secured at their lower ends to the respective hubs 13—13. At their outer ends the rods 18—18 are secured together by a cross rod 20, which may be a section of a hollow rod or a piece of tubing. In suitable locations on the handle bars 18—18 there are secured hand grips 21—21. These hand grips are similar to the hand grips used on bicycle handle bars, except that they are open at both ends.

The cage or wheel is generally designated by the reference numeral 30. This cage surrounds the swing 10. It is comprised principally by radially positioned spokes 31—31. Each spoke includes a center section 31a, which is positioned parallel to the axis of the axle 11 and the bearing sleeve 12. The side rods of the spokes 31—31 are integral with the center section 31a at the opposite ends of the latter and are curved inwardly on a positive and decreasing radius of curvature. At their inner ends the side rods 31—31 are attached by bolts 34 to hubs 35—35, which are secured to the axle 11 in any suitable manner. Rings 32—32, which are formed of circular rods, surround the cage for imparting rigidity to the structure. These rods are secured to the center sections 31a, as by welding, and are held in their relative positions by braces 33, which are also positioned in parallel relationship to the axis of the axle 11 and the bearing sleeve 12. Rings 32 and center sections 31a provide treads for the feet of the performer, whereby rotation of the cage is achieved.

A latch is provided for securing the swing 10 to the cage or wheel 30. This latch is comprised by a bolt 22, which is slidable in the bore of the cross rod 20 at the outer ends of one pair of the rods 18—18. When slid outwardly this bolt 22 will engage one of the spokes 31 of the cage or wheel 30 and latch the swing 10 to the latter. The bolt 22 is provided with an operating knob 23, which is a short headed rod received in a radial screw threaded hole in the bolt. The knob 23 is slidably received in an elongated slot 19 in the cross rod 20.

A retaining means is provided for holding the bolt 22 against accidental operation. This retaining means includes a pair of holes 24—24, which are of larger diameter than the width of the slot 19, are relatively axially spaced in the wall of the hollow cross rod 20, and have their centers on the center line of the slot 19. Between the holes 24—24 there are formed inwardly extending projections 25—25 on the sides of the slot 19. A split band 26 surrounds the hollow cross rod 20 just beyond the innermost hole 24, this band having parallel ears 26a—26a thereon. A bolt 27 is passed through aligned holes in the ears 26a—26a and has a suitable nut on its outer end. By loosening or tightening the split band 26, the relative spacing of the projections 25—25 may be varied. This spacing will generally be determined so that the knob 23 on the bolt will pass from the innermost hole 24 into the outermost hole 24 in the hollow cross, and vice versa, with snap action. It may, however, be made sufficiently small to lock the knob 23 in the innermost hole 24.

While the above description has been of a retaining means for right handed operation of the bolt 22, the retaining means may be adapted for left handed operation of the bolt by shifting the slot 19 in the hollow cross rod 20 inwardly and placing the holes 24—24 and tongues 25—25 adjacent the right forward rod 18 (FIGURE 5); and of course reversing the bolt 22.

The cable winding drums are comprised by hollow cylinders 38—38, which surround the axle 11 adjacent its opposite ends. Spokes 36 extend through diametral holes in the axle 11 and are suitably welded to the latter, and also to the inner walls of the drums 38—38 inside the ends of the latter. Adjacent the inner end of the right winding drum 38 (FIGURE 2) and the outer end of the left winding drum, two parallel ears 39—39 are welded to the outer walls of the winding drums. Between the ears 39—39 there is an arcuate cutaway section 37 formed in the wall of each drum. An outer ear 41 is secured to the outer wall at the inner end of the right winding drum 38 and a like ear to the outer wall at the outer end of the left winding drum 38, these ears being respectively in alignment with the pairs of ears 39—39. The outer ears 41—41 each support a right angle keeper bolt 44. Each keeper bolt has one arm 44a partly of cylindrical shape and its outer end flattened and with a suitable hole therein. A short bolt 45 extends through a hole 42 in the outer ear 41 and the aligned hole in the arm 44a of the keeper bolt and has a wing nut 46 on its outer end. The other arm 44b of the keeper bolt extends through aligned holes 43 in the outer ear and 40—40 in the ears 39—39.

Cables 48—48 are secured at their lower ends between the parallel ears on the winding drums 38—38 and at their upper ends are secured to any suitable overhead structural member (not shown). The lower end of each cable is doubled back on itself, to form an eye 48a, and the doubled end is secured to the main body of the cable by a wrapping 49. The loops 48a—48a on the cables surround rollers 47—47, which are rotatably mounted on the arms 44b—44b of the keeper bolts between the ears 39—39, and project into the arcuate cutaway sections 37—37 in the winding drums 38—38. In place of the rollers 47—47 half sleeves of sheet copper and semi-circular in cross section may surround the loops 48a—48a on the inner faces of the latter. These half sleeves may be readily replaced when worn.

Cable guides 50—50 are provided on the winding drums 38—38 to insure that the cables 48—48 will be wound onto the drums in single layers and in uniform manner. These are comprised by rings 50—50 of circular rod members. The rings 50—50 are concentrically positioned with respect to the cable winding drums 38—38 and are secured to the latter by spokes 51, which are welded at their outer ends to the rings and at their inner ends to the outer walls of the winding drums. The ring 50 on the right winding drum 38 (FIGURE 2) is positioned against the innermost ear 39 on the winding drum, but is inclined at an acute angle with respect to the transverse plane through the axle 11. Also, the spokes 51 are curved inwardly and downwardly so that the ring 50 is offset inwardly with respect to a plane through the junctures of the spokes with the outer wall of the winding drum 38. Similarly, the ring 50 on the left winding drum 38 is positioned against the outermost ear 39 on the winding drum but is inclined at an acute angle with respect to the transverse plane through the axle 11. Likewise, the spokes 51 are curved inwardly and downwardly so that the ring 50 is offset outwardly with respect to a plane through the junctures of the spokes with the outer wall of the winding drum 38.

In operation, a performer may step into the cage or wheel 30 and, by holding onto rods 14—14 just above the junctures of the back rest 17 with the latter, he can steady himself. Hand grips, similar to the hand grips 21—21 on the forwardly extending rods 18—18, may be placed on the rods 14—14 at these locations if desired.

While walking inside the cage 30 the performer faces in one direction and, when seated on the swing 10, he faces in the opposite direction. Hence, when the performer is ready to descend with the cage, he will slide the bolt 32 in the hollow cross rod 20 on the swing inwardly, to unlatch the swing 10 from the cage 30, take one step backward and mount the swing.

The cage 30 will now rotate, at first slowly, and then with increasing angular velocity while moving downwardly, unwinding the cables 48—48 from the winding drums 38—38. When the cables 48—48 from the winding drums 38—38 have become fully extended, the kinetic energy of the cage will be a maximum. The cage will now continue its direction of rotation and recoil up the cables 48—48, rewinding the latter on the winding drums 38—38. When the kinetic energy of the cage 30 on the recoil has been exhausted, the latter will slowly come to a stop, and then reverse both its direction of rotation and its direction of linear movement. At each upper limit of travel, as the direction of rotation and the direction of translatory movement are reversed, the maximum kinetic energy at the lower limit of travel has been converted into a maximum potential energy with a loss of energy during each cycle of travel. The cage 30 therefore never travels as far back up the cables 48—48 on each recoil movement as it did on the previous recoil movement. When the energy has been all dissipated, the cage 30 will come to rest, being merely supported by the cables 48—48.

It will be recognized that the above described action is identical in principle with that of a certain well known toy, commonly known as the "Yo-Yo."

As the above described movements are taking place, the performer may either stand in vertical position on the swing 10 or be seated on the latter. He can walk the cage 30 down slowly when standing in the upright position on the swing 10, or more rapidly when seated on the latter.

In order to stop the cage before the alternate downward travel and recoil movements of same have died out due to loss of energy, the performer will assume a sitting position on the swing 10 and, when the kinetic energy of the cage on the recoil movement has diminished so that it has come to a halt, he can put his feet down onto the rim, which is comprised by the circular rods 32—32, completely stopping the rotation of the cage with his weight and the force of his leg action, and then walk the cage 30, while still sitting on the swing 10, down to its starting point.

Having now fully described my invention, what I claim as new and useful and desire to secure by Letters Patent of the United States is:

1. An aerial trapeze mounted on an axle comprised by a cage including hubs mounted at spaced locations on the axle, arcuately spaced and radially extending pairs of members each secured at its inner end to a hub and being curved inwardly and the members of each pair being united at their outer end portions, winding drums mounted on said axle at the opposite ends of the latter, and supporting cables each secured at one end to a respective winding drum for being wound around the winding drum as the cage is raised and unwound therefrom as the cage is lowered, said cage being dimensioned to define a man-receiving chamber therewithin, the portions of each pair of members uniting the same defining treads for a man to walk on.

2. An aerial trapeze mounted on an axle comprised by a cage including hubs mounted at spaced locations on the axle, arcuately spaced and radially extending pairs of members each secured at its inner end to a hub and being curved inwardly and the members of each pair being united in a cross member parallel to the axle, winding drums mounted on said axle at the opposite ends of the latter, supporting cables each secured at one end to a respective winding drum for being wound around the winding drum as the cage is raised and unwound therefrom as the cage is lowered, said cage being dimensioned to define a man-receiving chamber therewithin, and said cross members defining treads for a man to walk on.

3. An aerial trapeze mounted on an axle comprised by a cage including hubs mounted at spaced locations on the axle, arcuately spaced and radially extending pairs of members each secured at its inner end to a hub and being curved inwardly and the members of each pair being united in a cross member parallel to the axle, circular members relatively spaced parallel to the axle surrounding and secured to said cross members, winding drums mounted on said axle at the opposite ends of the latter, supporting cables each secured at one end to a respective winding drum for being wound around the winding drum as the cage is raised and unwound therefrom as the cage is lowered, said cage being dimensioned to define a man-receiving chamber therewithin, and said cross members defining treads for a man to walk on.

4. An aerial trapeze comprised by a rotatable cage of generally cylindrical configuration mounted on an axle for rotation with the latter, winding drums mounted on said axle at the opposite ends of the latter, supporting cables each secured at one end to a respective winding drum for being wound around the winding drum as the cage is raised and unwound therefrom as the cage is lowered, and a swing comprised by hubs rotatably mounted on the axle adjacent and inwardly of the respective sides of the cage, downwardly and inwardly inclined members secured to the respective hubs, and a foot rest secured to the lower ends of said downwardly and inwardly inclined members.

5. An aerial trapeze comprised by a rotatable cage of generally cylindrical configuration mounted on an axle for rotation with the latter, winding drums mounted on said axle at the opposite ends of the latter supporting cables each secured at one end to a respective winding drum for being wound around the winding drum as the cage is raised and unwound therefrom as the cage is lowered, and a swing comprised by hubs rotatably mounted on the axle adjacent and inwardly of the respective sides of the cage, downwardly and inwardly inclined members secured to the respective hubs, a foot rest secured to the lower ends of the downwardly and inwardly inclined members, and stirrups mounted on the foot rest.

6. An aerial trapeze comprised by a rotatable cage of generally cylindrical configuration mounted on an axle for rotation with the latter, winding drums mounted on said axle at the opposite ends of the latter, supporting cables each secured at one end to a respective winding drum for being wound around the winding drum as the cage is raised and unwound therefrom as the cage is lowered, and a swing comprised by hubs rotatably mounted on the axle adjacent and inwardly of the sides of the cage, downwardly and inwardly inclined members secured to the respective hubs, a foot rest secured to the lower ends of the downwardly and inwardly inclined members, and a heel support bar secured to the downwardly and inwardly inclined members above the foot rest.

7. An aerial trapeze comprised by a rotatable cage of generally cylindrical configuration mounted on an axle for rotation with the latter, winding drums mounted on said axle at the opposite ends of the latter, supporting cables each secured at one end to a respective winding drum for being wound around the winding drum as the cage is raised and unwound therefrom as the cage is lowered, and a swing comprised by hubs rotatably mounted on the axle adjacent and inwardly of the respective sides of the cage, downwardly and inwardly inclined members secured to the respective hubs, a foot rest secured to the lower ends of said downwardly and inwardly inclined members, outwardly extending and inwardly curved members secured to the respective hubs and a cross member positioned parallel to the axle uniting the latter members at their outer ends.

8. An aerial trapeze comprised by a rotatable cage of generally cylindrical configuration mounted on an axle for rotation with the latter, winding drums mounted on said axle at the opposite ends of the latter, supporting cables each secured at one end to a respective winding drum for being wound around the winding drum as the cage is raised and being unwound therefrom as the cage is lowered, a swing pivotally mounted on said axle within the cage, and latching means for securing the swing to the cage for joint rotation with the latter.

9. An aerial trapeze mounted on an axle comprised by a cage including hubs mounted at spaced locations on the axle, arcuately spaced and radially extending pairs of members each secured at its inner end to a hub and being curved inwardly and the members of each pair being united in a cross member parallel to the axle, winding drums mounted on said axle at the opposite ends of the latter, and supporting cables each secured at one end to a respective winding drum for being wound around the winding drum as the cage is raised and unwound therefrom as the cage is lowered, a swing comprised by hubs rotatably mounted on the axle adjacent and inwardly of the respective hubs of the cage, downwardly and inwardly inclined members secured to the respective latter hubs, a foot rest secured to the lower ends of said downwardly and inwardly inclined members, outwardly extending and inwardly curved members secured to the respective latter hubs, a cross member positioned parallel to the axle uniting the latter members at their outer ends, and a latch carried by said cross member and engageable with one of the arcuately spaced and radially extending members of the cage for securing the swing to the cage.

References Cited by the Examiner

UNITED STATES PATENTS

| | | | |
|---|---|---|---|
| 1,419,402 | 6/22 | Mosher | 46—61 |
| 2,219,236 | 10/40 | Nakano | 46—61 X |

RICHARD C. PINKHAM, *Primary Examiner.*